US008150728B1

(12) United States Patent
Bayer et al.

(10) Patent No.: US 8,150,728 B1
(45) Date of Patent: Apr. 3, 2012

(54) AUTOMATED PROMOTION RESPONSE MODELING IN A CUSTOMER RELATIONSHIP MANAGEMENT SYSTEM

(75) Inventors: Judith A. Bayer, Ridgewood, NJ (US); Scott M. Collins, Raleigh, NC (US)

(73) Assignee: Teradata US, Inc., Dayton, OH (US)

( * ) Notice: Subject to any disclaimer, the term of this patent is extended or adjusted under 35 U.S.C. 154(b) by 2478 days.

(21) Appl. No.: 09/998,750

(22) Filed: Nov. 30, 2001

(51) Int. Cl.
*G06Q 30/00* (2012.01)
(52) U.S. Cl. .................................................... 705/14.1
(58) Field of Classification Search ................ 705/14, 705/14.1; 706/20
See application file for complete search history.

(56) References Cited

U.S. PATENT DOCUMENTS 6,631,360 B1 * 10/2003 Cook .............................. 706/20

* cited by examiner

*Primary Examiner* — Daniel Lastra
(74) *Attorney, Agent, or Firm* — Gates & Cooper LLP

(57) ABSTRACT

A Customer Relationship Management (CRM) system includes a CRM Client, CRM Engine, and Relational Database Management System (RDBMS). The CRM Client, CRM Engine, and RDBMS integrate a suite of services that allow users to plan, manage, and execute promotional or marketing campaigns, build customer segments, score customers, and analyze customer behavior, product purchases, and response to promotional campaigns. The services include an automated Analytic Data Set Creation service, which simplifies and automates the process of creating analytic data sets useful for modeling and analysis out of operational data stored in the relational database, and a Response Modeling service, which automatically creates promotion response models to score individual customers based on that model in order to predict which customers are most likely to respond to a future promotional campaign.

21 Claims, 3 Drawing Sheets

AUTOMATED PROMOTION RESPONSE MODELING IN A CUSTOMER RELATIONSHIP MANAGEMENT SYSTEM

CROSS REFERENCE TO RELATED APPLICATIONS

This application is related to the following co-pending and commonly assigned patent applications:

Utility application Ser. No. 09/998,038, entitled "CUSTOMER BUYING PATTERN DETECTION IN CUSTOMER RELATIONSHIP MANAGEMENT SYSTEMS," filed on Nov. 30, 2001, by Judy A. Bayer and Scott M. Collins; and Utility application Ser. No. 09/998,680, entitled "ANALYTIC DATA SET CREATION FOR MODELING IN A CUSTOMER RELATIONSHIP MANAGEMENT SYSTEM," filed on Nov. 30, 2001, by Judy A. Bayer and Scott M. Collins;

both of which applications are incorporated by reference herein.

BACKGROUND OF THE INVENTION

1. Field of the Invention

This invention relates in general to customer relationship management systems performed by computers, and in particular, to the implementation of automated promotion response modeling for use by customer relationship management system.

2. Description of Related Art

Computer-implemented customer relationship management (CRM) systems are used to help companies more effectively understand and communicate with its individual customers. Generally, CRM systems are implemented to support the marketing activities of a company, including modeling customer behavior, personalizing marketing activities directed at customers, and communicating with customers. Towards this end, CRM systems typically provide the capability to analyze what is transpiring in the business from customer, product and event viewpoints.

However, the analysis capabilities of prior CRM systems do not provide all the functionality needed. There is a need, especially, for automatic analytic data set creation and promotional response modeling using the data mined from a relational database management system.

SUMMARY OF THE INVENTION

A Customer Relationship Management (CRM) system includes a CRM Client, CRM Engine, and Relational Database Management System (RDBMS). The CRM Client, CRM Engine, and RDBMS integrate a suite of services that allow users to plan, manage, and execute promotional or marketing campaigns, build customer segments, score customers, and analyze customer behavior, product purchases, and response to promotional campaigns. The services include an automated Analytic Data Set Creation service, which simplifies and automates the process of creating analytic data sets useful for modeling and analysis out of operational data stored in the relational database, and an automated Response Modeling service, which automatically creates promotion response models to score individual customers in order to predict which customers are most likely to respond to a future promotional campaign.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware and Software Environment

Figure 1:
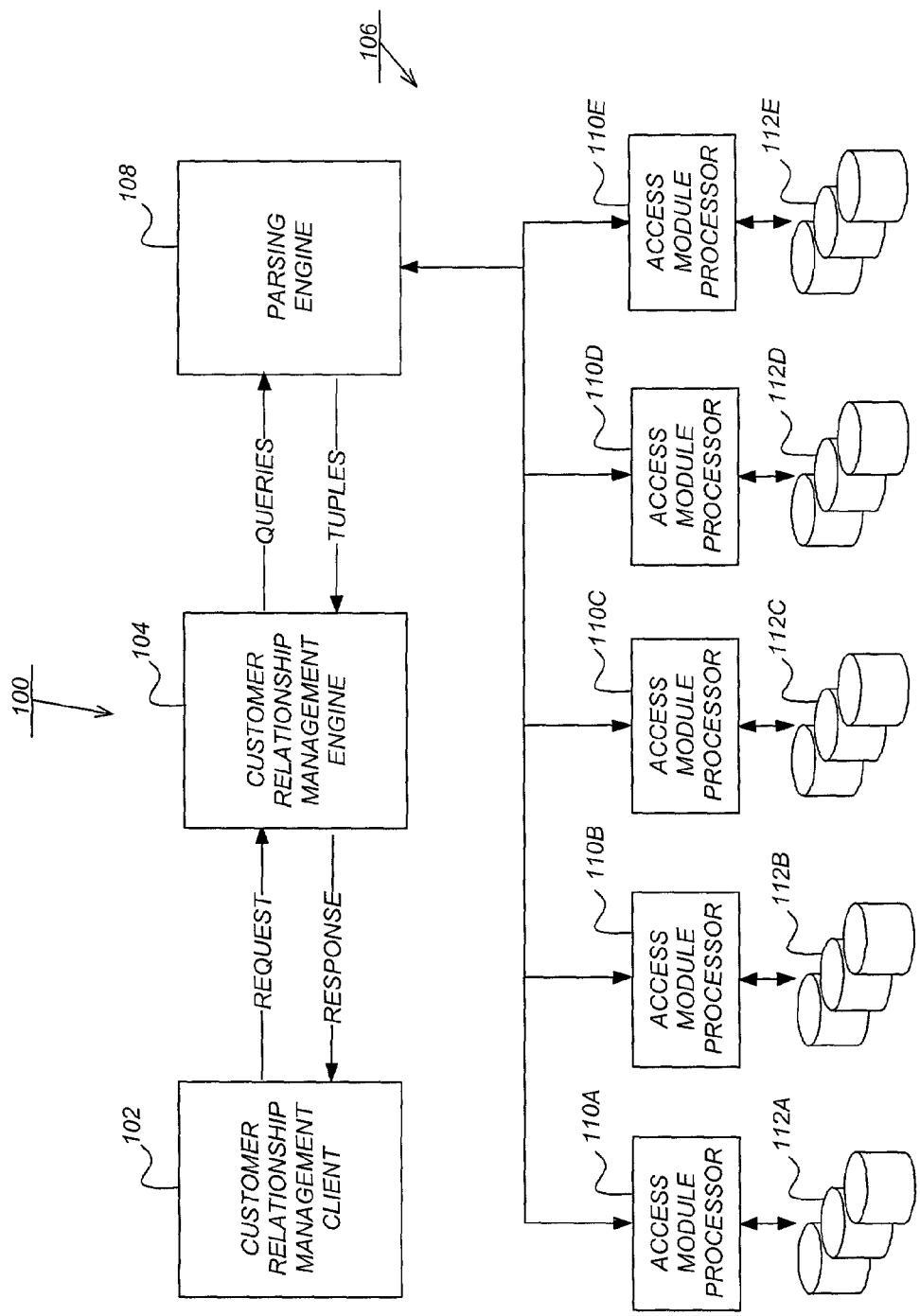
FIG. 1 illustrates an exemplary hardware and software environment according to the preferred embodiment of the present invention.

FIG. 1 illustrates an exemplary hardware and software environment according to the preferred embodiment of the present invention. In the exemplary environment, a computer system 100 implements a Customer Relationship Management (CRM) system in a three-tier client-server architecture, wherein the first or client tier provides a CRM Client 102 that may include, inter alia, a graphical user interface (GUI), the second or middle tier provides a CRM Engine 104 for data mining applications as described later in this application, and the third or server tier comprises a Relational DataBase Management System (RDBMS) 106 that stores the data and metadata in a relational database used in performing the services and functions requested by the CRM Client 102 and CRM Engine 104. The first, second, and third tiers may be implemented in separate machines, or may be implemented as separate or related processes in a single machine.

Generally, an operator interacts with the GUI of the CRM Client 102 to create requests that are transmitted to the CRM Engine 104 and to display responses received from the CRM Engine 104. The CRM Engine 104 performs the data mining applications and other processing, including commands or functions for performing various search and retrieval functions in the RDBMS 106, wherein queries are transmitted to the RDBMS 106 as requests and tuples are received therefrom as responses. The CRM Client 102 and the CRM Engine 104 may be implemented in separate machines, or may be implemented as separate or related processes in a single machine.

In the preferred embodiment, the RDBMS 106 includes at least one Parsing Engine (PE) 108 and one or more Access Module Processors (AMPS) 110A-110E storing the relational database in one or more data storage devices 112A-112E. The Parsing Engine 108 and Access Module Processors 110 may be implemented in separate machines, or may be implemented as separate or related processes in a single machine. The RDBMS 106 used in the preferred embodiment comprises the Teradata® RDBMS sold by NCR Corporation, the assignee of the present invention, although other DBMS's could be used.

In the preferred embodiment, the system 100 may use any number of different parallelism mechanisms to take advantage of the parallelism offered by multiple Access Module Processors 110. Further, data within the relational database may be fully partitioned across all data storage devices 112 in the system 100 using hash partitioning or other partitioning methods.

Generally, the CRM Client 102, CRM Engine 104, RDBMS 106, Parsing Engine 108, and/or Access Module Processors 110A-110E comprise logic and/or data tangibly embodied in and/or accessible from a device, media, carrier, or signal, such as RAM, ROM, one or more of the data storage devices 112A-112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Customer Relationship Management System

The CRM Client 102, CRM Engine 104, and RDBMS 106 of the present invention work together to provide an integrated, flexible, and powerful customer relationship management system. The CRM Client 102, CRM Engine 104, and RDBMS 106 integrate a suite of services that allow users to plan, manage, and execute promotional or marketing campaigns, build customer segments, score customers, and analyze customer behavior, product purchases, and responses to promotional campaigns. The services include an automated Analytic Data Set Creation service, which simplifies and automates the process of creating analytic data sets useful for modeling and analysis out of operational data stored in the relational database, and a Response Modeling service, which automatically creates a promotion response model to score individual customers based on that model in order to predict which customers are most likely to respond to a future promotional campaign. Both of these services are described in more detail below.

Analytic Data Set Creation Service

Figure 2:
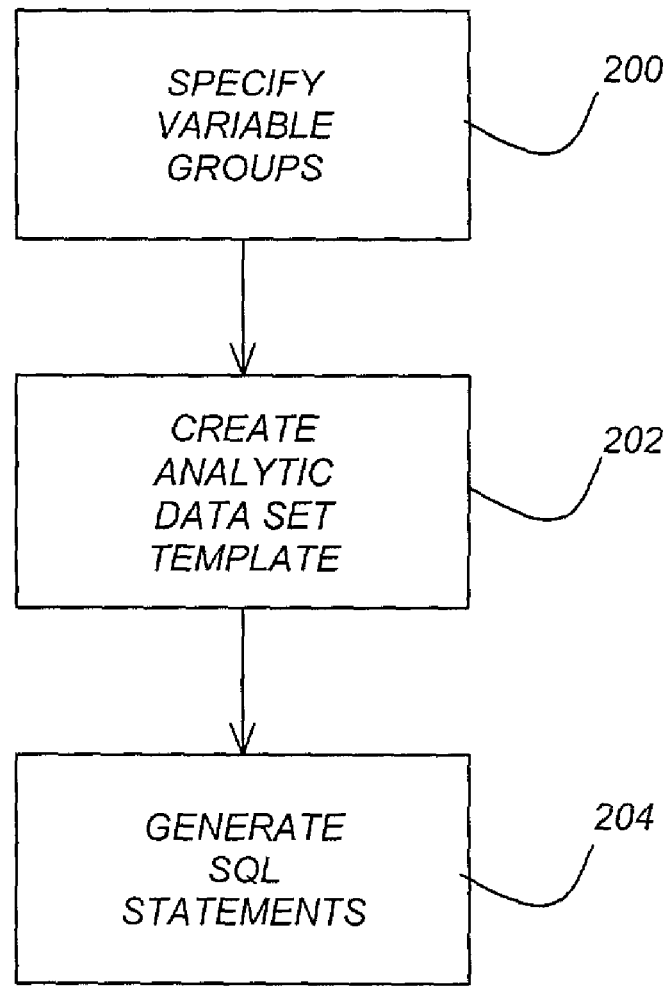
FIG. 2 is a flowchart that illustrates the steps performed by the Analytic Data Set Creation service according to the preferred embodiment of the present invention.

FIG. 2 is a flowchart that illustrates the steps performed by the Analytic Data Set Creation service according to the preferred embodiment of the present invention. The Analytic Data Set Creation service creates analytic data from operational data stored in the relational database and accessed via the RDBMS 106.

There are two underlying ways of representing data in the relational database: operational views of data and analytic views of data. Operational data, such as transaction data stored in a relational database, is fundamentally different from analytic data, which is the data required to support the modeling and analysis of customer behavior in the CRM system.

An example of operational data is transaction data, where there is one row of data per transaction. A transaction table is usually very deep and very narrow (e.g., there are many different rows, but not many fields per row). Moreover, each customer may be associated many rows (transactions).

Analytic data must be derived from the operational data; however, the large amounts of operational data that may be stored in the relational database often makes the derivation cumbersome. Generally, analytic data used for customer prediction response modeling has only one row per customer, although that one row may represent many transactions. Moreover, many different types of analytic data can be derived from a transaction table.

In using the Analytic Data Set Creation service, the user first specifies one or more Variable Groups (Block 200). A Variable Group is a set of Analytic Variables with similar characteristics, wherein the Analytic Variables are comprised of primitives and conditions that describe how the Analytic Variables are derived from the operational data. Primitives are base variables, while conditions are predicates, aggregates or other functions.

The Analytic Data Set Creation service provides for Smart Variable Definition that allows the user to define multiple Analytic Variables that are variations on a base variable. For example, "Sum of Sales" in "Merchandise Department" during "Last 6 Months" may identify hundreds of variables. However, the system could create an Analytic Variable by summing a "Sales" base variable (i.e., primitive) associated with multiple primitives (e.g., Department and Transaction Date variables) and conditions (e.g., Department="Merchandise" and Transaction Date>"Feb. 1, 2001").

Thereafter, the user creates an Analytic Data Set Template containing the desired Analytic Variables required for a specific analysis task (Block 202). These Analytic Variables are selected from one or more Variable Groups for inclusion in the Analytic Data Set Template. Moreover, execution conditions can be defined for the Analytic Data Set Template and the Template scheduled for later execution, or the Template may be executed on an ad-hoc basis, wherein the user selects a segment (e.g., a subset of a table) from the relational database and applies the Template to the segment.

Finally, the Analytic Data Set Creation service performs a Smart SQL Generation function that generates SQL statements (or other instructions) that retrieve and/or generate the desired Analytic Variables contained in the Analytic Data Set Template from the relational database using the specified primitives and conditions (Block 204). The generated SQL statements may also contain variable transformation information, wherein transaction data from the relational database is identified, aggregated and/or modified to generate the Analytic Variables.

Creating large numbers of Analytic Variables from operational data in the relational database can potentially take a long time to execute. The Smart SQL Generation function can create as many as 256 Analytic Variables using a single set of SQL statements.

A number of benefits are provided by the Analytic Data Set Creation service. For example, the service saves time and effort by analysts and support staff, so analysts can spend more time doing analysis, rather than mining data from the relational database. Moreover, the Analytic Data Set Creation service leverages work previously done by creating a library of analytic variables that can be used by anyone, which promotes consistent use of information. Moreover, the Analytic Data Set Creation service makes it much easier to deploy models for use by multiple analysts.

Response Modeling Service

Figure 3:
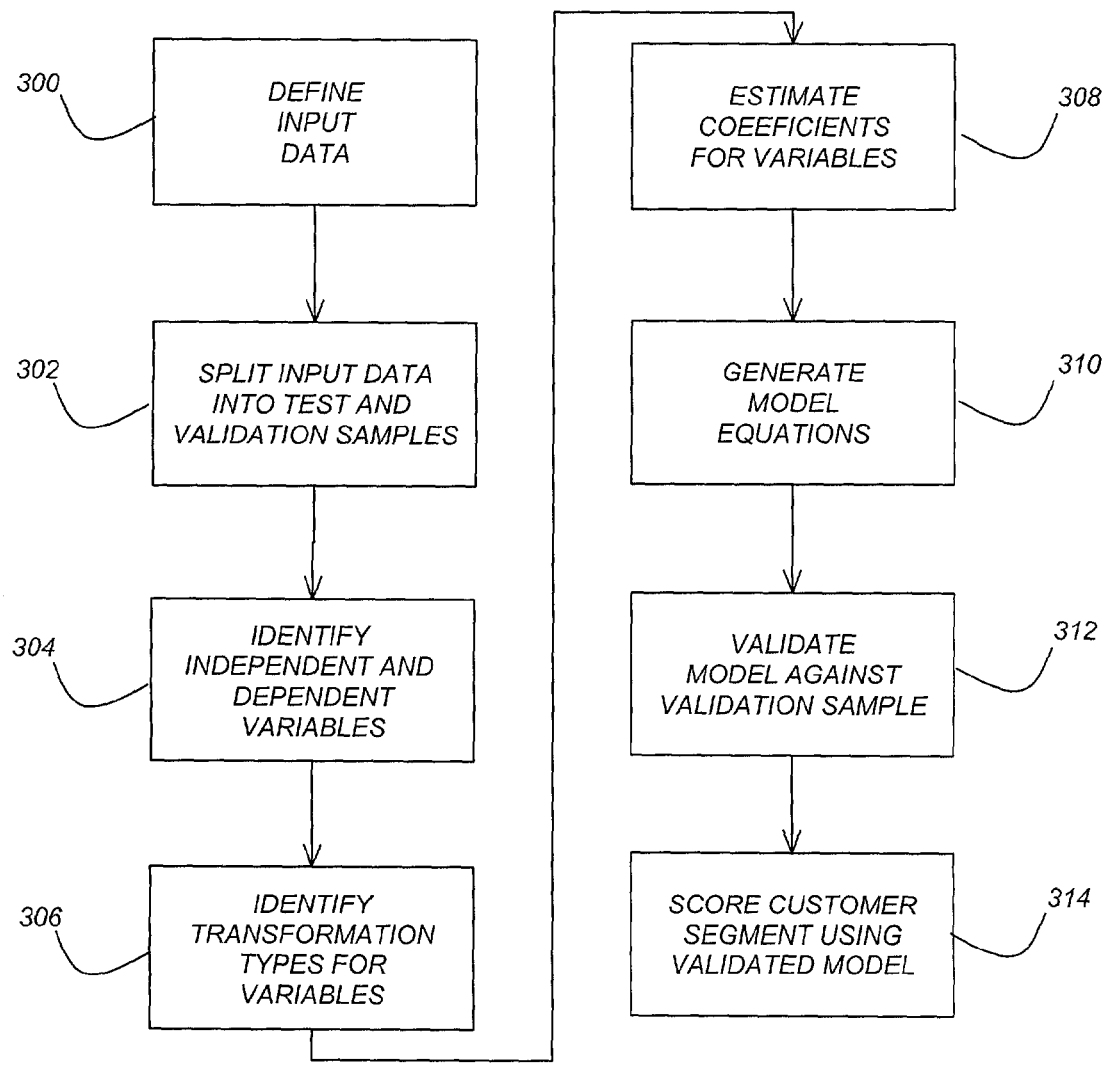
FIG. 3 is a flowchart that illustrates the steps performed by the Response Modeling service according to the preferred embodiment of the present invention

FIG. 3 is a flowchart that illustrates the steps performed by the Response Modeling service according to the preferred embodiment of the present invention. The Response Modeling Service creates and validates a customer promotion response model that comprises a statistical model that is used to predict the likelihood that a specific customer will respond to a promotional campaign in the future.

In order to create a predictive response model, data describing past behavior must exist on which to base that prediction. To accomplish this, the Response Modeling service utilizes data that is derived from the relational database, either through the Analytic Data Set Creation service or by manual efforts.

Using the data derived from the relational database, the Response Modeling service performs the following functions:

- Automatically create a statistical model that will predict the likelihood a customer will respond to a particular kind of campaign.
- Automatically score customers in the relational database based on the statistical model.
- Automatically produce a list of customers that have high propensity to respond based on the scores.
- Help marketing analysts more accurately predict customer buying behavior based on the scores and understand drivers of product and/or service usage and brand loyalty.
- Provide a wide range of outputs to help users interpret results, including:
    - Information about the variables included in the model, including an assessment of the relative importance of the different variables,
    - Deciling information about customers in the validation sample, which includes an analysis of behavioral and demographic variables for customers in each decile,
    - Store reports showing the distribution of customers by decile, for each store or store region,
    - Lift charts showing the expected response to the promotion, by decile and cumulatively, and
    - Statistical measures, including those that compare the current model to other models stored in a model database.
- Provide a model database where models are stored, along with statistics evaluating model quality and descriptive information about the model.
- Provide the ability to compare models and their predictive capabilities.

The steps performed by the Response Modeling service are illustrated in FIG. 3, and include the definition of the input data, model estimation, model validation, and customer scoring The definition of the input data for the response model is perhaps the most critical step in the entire process (Block 300). Generally, the input data is comprised of a set of Analytic Variables that are subdivided into independent and dependent variables, wherein the dependent variables are also known as response variables. These Analytic Variables are statistically tested to determine which variables, if any, are significant in differentiating actual responders from non-responders to a past event.

Once selected, the input data set is split into two samples: a test or training sample and a validation or holdout sample (Block 302). This split is based on a stratified random sample of customers from the input data with the largest portion, e.g., 70%, being reserved for the test sample and the remainder, e.g., 30%, being reserved for the validation sample.

The Response Modeling service then identifies related independent and dependent variables using the test sample, in order to create a response model that best predicts the likelihood of a response from a customer, given the knowledge of actual responses to past promotional campaigns (Block 304). This is accomplished by the Response Modeling service examining each of the independent variables and attempting to identify the related dependent variables, in order to determine which of these variables has a significant impact in differentiating responders from non-responders. The Response Modeling separates the predictive variables from the others. The selected Analytic Variables comprise the response model, and this model is likely to contain fewer Analytic Variables than are contained in the input data.

The Response Modeling service then identifies a Transformation Type for the identified related independent and dependent variables, i.e., the predictive variables (Block 306). The Transformation Type is a mathematical operation that provides the strongest association between the identified related independent variable and the dependent variables. Possible transformation types are listed in the following Table, although this list is not intended to be exhaustive and other transformations may be used as well.

| Transformation Type | Definition |
| --- | --- |
| None | $X$ |
| Square | $X^2$ |
| Square Root + 1 | $(X + 1)^{1/2}$ |
| Cube | $X^3$ |
| Cube root + 1 | $(X + 1)^{1/3}$ |
| Natural Log Function + 1 | $\ln(X + 1)$ |
| Exponential Function + 1 | $e^{(X + 1)}$ |
| Inverse + 1 | $1/(X + 1)$ |
| Z Score | $(X - \text{Average}(X))/$ Standard Deviation of $X$ |

After identifying a Transformation Type, the Response Modeling service estimates a Coefficient, or weight, for each of the identified related independent and dependent variables found to be significant in predicting the likelihood of response (Block 308). The Coefficient is a relative measure of the contribution of a variable to the likelihood of response. However, the size of the Coefficient does not indicate the relative importance of the variable in predicting the likelihood of response, since it is itself dependent on the magnitude of the variable. The sign of the Coefficient indicates whether the independent variable is positively or negatively correlated with the dependent variable.

After estimating a Coefficient, the Response Modeling service generates a Model Equation that is a mathematical representation of the association of the identified related independent and dependent variables that result in a statistical best fit of known responders versus non-responders (Block 310). Specifically, the Model Equation includes an association of the independent variable with the dependent variable that best differentiates responders from non-responders, as well as the Transformation Type and the Coefficients associated with the variables.

The Response Modeling service applies the Model Equation to the validation sample, in order to validate the predictability of the response model (Block 312). This step validates the Model Equation by comparing a predicted likelihood of response with an actual response. The Response Modeling service provides extensive outputs that can be employed by users to determine the validity of the model from an analytic perspective.

If the validation of the Model Equation is satisfactory, the user can choose to score customers retrieved from the relational database for a future campaign (Block 314). Scoring a customer differs from model validation in that the Model Equation is applied to a segment of customers retrieved from the relational database for a future campaign, rather than a past campaign. For example, the customers that are scored do not have to include anyone who was part of the past campaign.

Thereafter, the user can select a customer segment for a future campaign based on the scores of the customers in the segment, as well as on any other attribute. Selecting only those people with the highest likelihood to respond, (e.g., with the highest scores), allows the user to reduce the number of people targeted in the promotional campaign, while increasing the number of responders. It also allows the user to select effectively from a different pool of people. As a result, costs are reduced.

The automatic Response Modeling service provides many advantages over traditional approaches to creating and using promotion response models. For example, the Response Modeling service generates statistical models quicker and less expensively than manual modeling, thereby making it feasible to create a more extensive set of models. Moreover, the Response Modeling service develops the models using the most current data for estimating behavior, lessening the concern about model obsolescence. In addition, users of the Response Modeling service can more easily test out alternative promotion campaigns and score alternative customer segments, both of which can be assessed in terms of expected response.

CONCLUSION

This concludes the description of the preferred embodiment of the invention. The following paragraphs describe some alternative embodiments for accomplishing the same invention.

In one alternative embodiment, any type of computer or configuration of computers could be used to implement the present invention. In addition, any database management system, decision support system, on-line analytic processing system, or other computer program that performs similar functions could be used with the present invention. Finally, although the terms Analytic Variables, Variable Groups, Analytic Data Set Templates, Transformation Types, Coefficients, and Model Equations have specific meanings as described herein, these descriptions are not intended to be exhaustive and other definitions may be used as well.

In summary, the present invention discloses a Customer Relationship Management (CRM) system includes a CRM Client, CRM Engine, and Relational Database Management System (RDBMS). The CRM Client, CRM Engine, and RDBMS integrate a suite of services that allow users to plan, manage, and execute promotional or marketing campaigns, build customer segments, score customers, and analyze customer behavior, product purchases, and response to promotional campaigns. The services include an automated Analytic Data Set Creation service, which simplifies and automates the process of creating analytic data sets useful for modeling and analysis out of operational data stored in the relational database, and a Response Modeling service, which automatically creates promotion response models to score individual customers based on that model in order to predict which customers are most likely to respond to a future promotional campaign.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method of creating a customer promotion response model for use in customer relationship marketing, comprising:
   (a) generating, in a computer, an input data set for the response model, wherein the input data set is generated using an Analytic Data Set Template containing one or more Analytic Variables that include both primitives that are base variables and conditions that are predicates, aggregates or other functions, wherein the primitives and conditions determine how the Analytic Variables are derived from operational data to produce the input data set, and wherein the Analytic Variables are subdivided into independent variables and their related dependent variables;
   (b) splitting, in the computer, the input data set into a test sample and a validation sample;
   (c) identifying, in the computer, the independent variables and their related dependent variables using the test sample;
   (d) identifying, in the computer, a Transformation Type for each of the identified independent variables and their related dependent variables;
   (e) estimating, in the computer, a Coefficient for each of the identified independent variables and their related dependent variables;
   (f) generating, in the computer, a Model Equation for each of the identified independent variables and their related dependent variables using the identified Transformation Type and estimated Coefficient;
   (g) validating, in the computer, the generated Model Equation by applying it to the validation sample; and
   (h) scoring, in the computer, customers retrieved from a database using the validated Model Equation as a customer promotion response model for use in customer relationship marketing.

2. The method of claim 1, wherein the Transformation Type is a mathematical operation that identifies an association between the identified related independent and dependent variables.

3. The method of claim 1, wherein the Coefficient is a relative measure of the identified related independent and dependent variables' contributions to a likelihood of response.

4. The method of claim 1, wherein the Coefficient's sign indicates whether the independent variable is positively or negatively correlated with the dependent variable.

5. The method of claim 1, wherein the Model Equation is a mathematical representation of the association of the identified related independent and dependent variables that result in a statistical best fit of known responders versus non-responders.

6. The method of claim 1, wherein the validating step (g) further comprises applying the generated Model Equation to the validation sample in order to predict a likelihood of response as compared to an actual response in the validation sample.

7. The method of claim 1, wherein the scoring step (h) further comprises applying the validated Model Equation to the customers retrieved from the database in order to predict responses from the customers in a future promotional campaign.

8. A computer-implemented system for creating a customer promotion response model for use in customer relationship marketing, comprising:
  (a) a computer;
  (b) a customer relationship marketing system, performed by the computer, for:
    (1) generating an input data set for the response model, wherein the input data set is generated using an Analytic Data Set Template containing one or more Analytic Variables that include both primitives that are base variables and conditions that are predicates, aggregates or other functions, wherein the primitives and conditions determine how the Analytic Variables are derived from operational data to produce the input data set, and wherein the Analytic Variables are subdivided into independent variables and their related dependent variables;
    (2) splitting the input data set into a test sample and a validation sample;
    (3) identifying the independent variables and their related dependent variables using the test sample;
    (4) identifying a Transformation Type for each of the identified independent variables and their related dependent variables;
    (5) estimating a Coefficient for each of the identified independent variables and their related dependent variables;
    (6) generating a Model Equation for each of the identified independent variables and their related dependent variables using the identified Transformation Type and estimated Coefficient;
    (7) validating the generated Model Equation by applying it to the validation sample; and
    (8) scoring customers retrieved from a database using the validated Model Equation as a customer promotion response model for use in customer relationship marketing.

9. The system of claim 8, wherein the Transformation Type is a mathematical operation that identifies an association between the identified related independent and dependent variables.

10. The system of claim 8, wherein the Coefficient is a relative measure of the identified related independent and dependent variables' contributions to a likelihood of response.

11. The system of claim 8, wherein the Coefficient's sign indicates whether the independent variable is positively or negatively correlated with the dependent variable.

12. The system of claim 8, wherein the Model Equation is a mathematical representation of the association of the identified related independent and dependent variables that result in a statistical best fit of known responders versus non-responders.

13. The system of claim 8, wherein the logic for validating (7) further comprises logic for applying the generated Model Equation to the validation sample in order to predict a likelihood of response as compared to an actual response in the validation sample.

14. The system of claim 8, wherein the logic for scoring (8) further comprises logic for applying the validated Model Equation to the customers retrieved from the database in order to predict responses from the customers in a future promotional campaign.

15. An article of manufacture comprising a storage device embodying instructions that, when read and executed by a computer, result in the computer performing a method for creating a customer promotion response model for use in customer relationship marketing, comprising:
  (a) generating, in a computer, an input data set for the response model, wherein the input data set is generated using an Analytic Data Set Template containing one or more Analytic Variables that include both primitives that are base variables and conditions that are predicates, aggregates or other functions, wherein the primitives and conditions determine how the Analytic Variables are derived from operational data to produce the input data set, and wherein the Analytic Variables are subdivided into independent variables and their related dependent variables;
  (b) splitting, in the computer, the input data set into a test sample and a validation sample;
  (c) identifying, in the computer, the independent variables and their related dependent variables using the test sample;
  (d) identifying, in the computer, a Transformation Type for each of the identified independent variables and their related dependent variables;
  (e) estimating, in the computer, a Coefficient for each of the identified independent variables and their related dependent variables;
  (f) generating, in the computer, a Model Equation for each of the identified independent variables and their related dependent variables using the identified Transformation Type and estimated Coefficient;
  (g) validating, in the computer, the generated Model Equation by applying it to the validation sample; and
  (h) scoring, in the computer, customers retrieved from a database using the validated Model Equation as a customer promotion response model for use in customer relationship marketing.

16. The article of manufacture of claim 15, wherein the Transformation Type is a mathematical operation that identifies an association between the identified related independent and dependent variables.

17. The article of manufacture of claim 15, wherein the Coefficient is a relative measure of the identified related independent and dependent variables' contributions to a likelihood of response.

18. The article of manufacture of claim 15, wherein the Coefficient's sign indicates whether the independent variable is positively or negatively correlated with the dependent variable.

19. The article of manufacture of claim 15, wherein the Model Equation is a mathematical representation of the association of the identified related independent and dependent variables that result in a statistical best fit of known responders versus non-responders.

20. The article of manufacture of claim 15, wherein the validating step (g) further comprises applying the generated Model Equation to the validation sample in order to predict a likelihood of response as compared to an actual response in the validation sample.

21. The article of manufacture of claim 15, wherein the scoring step (h) further comprises applying the validated Model Equation to the customers retrieved from the database in order to predict responses from the customers in a future promotional campaign.

* * * * *